(12) United States Patent
Ikegaya et al.

(10) Patent No.: US 6,648,414 B2
(45) Date of Patent: Nov. 18, 2003

(54) RECLINING DEVICE AND METHOD FOR MANUFACTURING THE SAME

(75) Inventors: Isao Ikegaya, Shizuoka-ken (JP); Tetsuya Ohba, Shizuoka-ken (JP)

(73) Assignee: Fujikikio Kabushiki Kaisha, Shizuoka-Ken (JP)

(*) Notice: Subject to any disclaimer, the term of this patent is extended or adjusted under 35 U.S.C. 154(b) by 0 days.

(21) Appl. No.: 10/091,848

(22) Filed: Mar. 6, 2002

(65) Prior Publication Data

US 2002/0140267 A1 Oct. 3, 2002

(30) Foreign Application Priority Data

Mar. 30, 2001 (JP) ........................... 2001-101156
Mar. 30, 2001 (JP) ........................... 2001-101177

(51) Int. Cl.$^7$ ............................................. B60N 2/02
(52) U.S. Cl. ....................................... 297/367
(58) Field of Search ........................... 297/367

(56) References Cited

U.S. PATENT DOCUMENTS

| | | | |
|---|---|---|---|
| 5,590,931 A | | 1/1997 | Fourrey et al. |
| 5,622,407 A | * | 4/1997 | Yamada et al. ............. 297/366 |
| 5,785,386 A | * | 7/1998 | Yoshida ...................... 297/367 |
| 5,857,746 A | * | 1/1999 | Barrere et al. .............. 297/367 |
| 5,881,854 A | * | 3/1999 | Rougnon-Glasson ........ 192/15 |
| 6,095,608 A | * | 8/2000 | Ganot et al. ................. 297/367 |
| 6,112,370 A | * | 9/2000 | Blanchard et al. ............ 16/325 |
| 6,164,723 A | * | 12/2000 | Ganot .................... 297/378.12 |
| 6,318,805 B1 | * | 11/2001 | Asano ........................ 297/367 |
| 6,325,458 B1 | * | 12/2001 | Rohee et al. ................ 297/367 |
| 6,332,649 B1 | * | 12/2001 | Vossmann .................... 297/366 |
| 6,364,413 B1 | * | 4/2002 | Rohee et al. ................ 297/367 |
| 6,454,354 B1 | * | 9/2002 | Vossmann et al. .......... 297/367 |
| 2002/0017811 A1 | * | 2/2002 | Cilliere et al. .............. 297/367 |

FOREIGN PATENT DOCUMENTS

| | | | | |
|---|---|---|---|---|
| EP | 0 978 413 A1 | | 2/2000 | |
| JP | 05168538 A | * | 7/1993 | ........... A47C/1/025 |

OTHER PUBLICATIONS

Patent Abstract of Japan, Patent No. 2000-342370, published on Dec. 12, 2000.
Patent Abstract of Japan No.: 07-136032, published on May 30, 1995.

* cited by examiner

Primary Examiner—Peter M. Cuomo
Assistant Examiner—Stephen D'Adamo
(74) Attorney, Agent, or Firm—Kilpatrick Stockton LLP

(57) ABSTRACT

A casing 10 includes second gears 20 having second locking cams 25 disposed in axial symmetry with a rotational axis of the casing 10, and guides 11A each having a slide-contacting face 11c, disposed in axial symmetry with a rotational axis of the casing 10 and on a straight line L4 perpendicular to a line L3 passing through the second locking cams 25. A cam 40 includes a plurality of first locking cams 41 for pressing the second locking cams 25, disposed in axial symmetry with a rotational axis of the cam 40, and guiding faces 45 disposed in axial symmetry with a rotational axis of the cam 40 and on a straight line L2 perpendicular to a line L1 passing through the first locking cams 41. A shaft 30 includes coupling portions 32, 34 for transmitting external torque and is press-fitted into the center hole 42 of cam 40 at a predetermined rotational angle.

16 Claims, 8 Drawing Sheets

RECLINING DEVICE AND METHOD FOR MANUFACTURING THE SAME

BACKGROUND OF THE INVENTION

1. Field of the Invention

The present invention relates to a reclining device and to a manufacturing method thereof.

2. Description of the Related Art

As for the seat reclining device for use in a vehicle, there have been known various kinds of devices, one example of which is disclosed in Japanese Patent Unexamined Publication No. H7(1995)-136032.

According to this known seat reclining device, a casing attached to the base plate of a seat cushion and a cap attached to the arm plate of a seat back are rotatably coupled with each other. When it is desired that the casing and the cap are fixed relative to each other, a cam plate mounted on an operating shaft is rotated by a predetermined degree, thereby shifting a locking tooth of the casing toward an internal tooth gear formed on the inner circumferential surface of the cap so as to engage the locking tooth with the internal tooth gear. With this, due to the contact between the cam plate and a cam face formed on the locking tooth, the locking tooth is pressed onto the internal tooth gear.

When it is desired that the casing and the cap are rotated relative to each other, the cam plate is rotated in the opposite direction, thereby moving the locking tooth away from the internal tooth gear so as to disengage the locking tooth from the internal tooth gear.

The cam plate is designed such that two locking teeth located axially opposite to each other can be simultaneously moved by the cam plate. In order to ensure the engagement between each of these locking teeth and the internal tooth gear, clearance has to be provided between the hole of the cam plate and the operating shaft. Due to this clearance, looseness is generated between the cam plate and the operating shaft, causing backlash and noise.

With a view to solving this problem, it has been proposed that the operating lever be provided with a spring. This proposal, however, invites problems in that the number of parts and the number of steps for assembling the device are increased.

Further, according to this known seat reclining device, the magnitude of shift of the locking tooth portion toward the internal tooth gear is very small as compared with the magnitude of shift of the cam face of the cam plate in a circumferential direction. In other words, non-uniformity of the distance between the locking tooth and the internal tooth gear is amplified to a larger non-uniformity in the range of rotation of the cam plate and of the operating shaft. Due to the non-uniformity of all the constituent components, the range of the rotational angle of the operating shaft varies individually. This causes a problem in that the angle of the operating lever coupled to the operating shaft cannot be constant.

SUMMARY OF THE INVENTION

Therefore, an object of the present invention is to provide a reclining device which can prevent the generation of abnormal noise and also can minimize the non-uniformity of the range of the rotational angle of the operating shaft, while maintaining the balance of the thrusting force between the cam plate and the locking tooth portion.

A first aspect of the present invention is a reclining device comprising: a casing; a cap rotatably mounted on the casing, having a first gear along the inner circumference thereof; a plurality of second gears for engaging with the first gear, each having a first locking cam face, disposed in axial symmetry with a rotational axis of the casing; a cam comprising a plurality of second locking cam faces for pressing the first locking cam faces to thereby engage the second gear with the first gear, disposed in axial symmetry with a rotational axis of the cam; and a plurality of guiding faces disposed in axial symmetry with a rotational axis of the cam and on a straight line perpendicular to a line that passes through two second locking cam faces located axially opposite each other; and a plurality of guides for guiding the guiding faces, disposed in axial symmetry with a rotational axis of the casing and on a straight line perpendicular to a line passing through two first locking cam faces located axially opposite each other.

A second aspect of the present invention is the reclining device according to the first aspect, wherein each of the guiding faces is formed as a circular arc centered on the rotational axis of the cam, thereby enabling the guiding faces to always be in contact with the guides in the rotation range of the cam.

Since the reclining device is constructed as described above, the movement of the cam is restricted whilst the freedom of rotation is secured, thereby stabilizing the cam. In other words, since the cam is allowed to freely rotate to a position where its pressing force to each of the second gears can be balanced, the tooth of each of second gears can be reliably engaged with the first gear. Accordingly, since it is no longer necessary to provide any play in the fitting between the center hole of the cam and the shaft, the generation of noise due to play can be prevented and, at the same time, the number of parts and the number of steps for assembling the device can be reduced.

A third aspect of the present invention is the reclining device according to the first aspect, further comprising a shaft having a coupling portion for transmitting external torque, wherein the shaft is configured to be press-fitted into a center hole of the cam when the coupling portion is aligned with the casing at a predetermined rotational angle.

A fourth aspect of the present invention is the reclining device according to the third aspect, wherein the shaft is configured to be press-fitted into the center hole of the cam after the second gears engage with the first gear at a predetermined rotational angle.

A fifth aspect of the present invention is the reclining device according to the third aspect, further comprising a seat cushion, a seat back, and a connecting shaft, wherein one of the casing and the cap is disposed on both the right and left sides of the seat cushion, and the other is disposed on both the right and left sides of the seat back, and the connecting shaft connects the respective shafts at both the right and left sides via the respective coupling portions.

Since the reclining device is further constructed as described above, it is possible to press-fit the shaft into the center hole of the cam after finishing the assembly of the casing, the cap, the second gears and the cam.

Further, the rotational angle of the shaft with respect to the casing can be locked. Accordingly, when the operating lever is attached to each of the coupling portions of the shaft, the extending direction of the operating lever can be kept constant.

In a case where the casing is coupled with the seat cushion, the shaft can be kept at a predetermined angle with respect to the seat cushion. In other words, when the operating lever is attached to the shaft, for example, the operating lever can be kept at a predetermined angle with respect to the seat cushion.

A sixth aspect of the present invention is the reclining device according to the fifth aspect, wherein the coupling portions connected to the connecting shaft have play interposed therebetween of predetermined angle in a rotational direction.

A seventh aspect of the present invention is a method of manufacturing the reclining device according to the first aspect, comprising the steps of: a) preparing a casing, a cap, second gears, a cam and a shaft; the cap being rotatably mounted to the casing, having a first gear along its inner circumference; a plurality of the second gears for engaging with the first gear, each having a first locking cam face, disposed in axial symmetry with a rotational axis of the casing; the cam comprising a plurality of second locking cam faces for pressing the first locking cam faces to thereby engage the second gears with the first gear, which are disposed in axial symmetry with a rotational axis of the cam, and a plurality of guiding faces disposed in axial symmetry with a rotational axis of the cam and on a straight line perpendicular to a line passing through two second locking cam faces located axially opposite each other; and a shaft having a coupling portion for transmitting external torque; b) assembling the casing, the second gears, the cam and the cap with each other; c) aligning the coupling portion with the casing at a predetermined rotational angle; and d) press-fitting the shaft into a center hole of the cam.

An eighth aspect of the present invention is the method of manufacturing the reclining device according to the seventh aspect, wherein the step of aligning the coupling portion with the casing at a predetermined rotational angle is performed with the second gears engaged with the first gear at a predetermined rotational angle.

By disposing the reclining devices of this invention on both the right and left sides of the seat back and coupling them with each other, the seat back can be reliably and safely reclined to a predetermined angle. Further, since the rotational angle of the coupling portions of shaft with respect to the casing is the same on both sides, the connecting shaft can be easily coupled to each of the shafts. In other words, it becomes possible to minimize the play required for fitting the coupling portions in the connecting shaft. Further, it becomes possible to minimize the time difference of engagement or disengagement between the right and left sides when only one shaft is rotated. Therefore, the feeling when setting the angle of the seat back is improved.

Since minimal play is provided at the connection between the coupling portions of the shaft and the connecting shaft, even when a large force is transferred from a belt anchor to the seat cushion, and causes, for example, the shaft of the left side to rotate due to the elastic deformation of the seat cushion, and this rotation is then transmitted via the connecting shaft to the shaft of the right side, the tooth of the right side can be kept engaged with the first gear.

BRIEF DESCRIPTION OF THE DRAWINGS

The invention will now be described with reference to the accompanying drawings wherein.

DETAILED DESCRIPTION OF THE INVENTION

An embodiment of the present invention will be explained below with reference to the drawings, wherein like numbers are designated by like reference characters.

A seat reclining device E for a vehicle shown in this embodiment is provided with a cap 60 fitted in the inner side of a circular recessed portion 14 formed in a casing 10. The cap 60 is coaxially rotatable along the inner circumferential surface of the circular recessed portion 14. This reclining device E is also provided with pivot type locking teeth 20 and a rotatable cam 40, both of which are interposed between the casing 10 and the cap 60.

The cap 60 is provided with internal tooth gears 61 as first gears along its inner circumference surface, which are axially opposite to each other. The locking teeth 20 as second gears are disposed at two positions of the casing 10 and are free to pivot. Each locking tooth 20 is provided with an external tooth gear 21 and is disposed facing a respective internal tooth gear 61 so as to engage with the internal tooth gear 61. The cam 40 rotates in the counterclockwise direction in FIG. 1 about its center hole 42, thereby pushing each of the locking tooth 20 outward in a radial direction, thus enabling the external tooth gears 21 to engage with the internal tooth gears 61. The cam 40 also rotates in the opposite direction, in other words clockwise in FIG. 1, about its center hole 42, thereby releasing the above-mentioned engagement.

Under the condition where one of the casing 10 and the cap 60 is coupled with the seat cushion 150, and the other is coupled with the seat back 160, when the external tooth gear 21 of the locking tooth 20 engages with the internal tooth gear 61, the seat back 160 can be-maintained at a predetermined angle with respect to the seat cushion 150. Note that, in this embodiment, casings 10 are disposed on and fixed to both the right and left sides of the seat cushion 150, and caps 60 are disposed on and fixed to both the right and left sides of the seat back 160, wherein operating shafts 30 are disposed on both the right and left sides and coupled with each other by a cylindrical connecting shaft 50 via serrations 32 as coupling portions to be described later.

The operating shaft 30 is designed to be press-fitted into the center hole 42 of the cam 40 to be fixed thereto. This operating shaft 30 is provided with serrations 32, 34 for transmitting external torque. Under the condition where each of the serrations 32, 34 is aligned with a predetermined position in the rotational direction in the casing 10, the operating shaft 30 is press-fitted into the center hole 42 of the cam 40. Note that the serration 32 is designed to be engaged with the serration 51 formed on the inner surface of the connecting shaft 50, while the serration 34 is designed to be engaged with the serration 35 formed in the coupling hole of the operating lever 31. These serrations 32, 34 are identical in position and in the configuration of recess and projection in a circumferential direction.

Further, the press-fitting shaft portion 30a of the operating shaft 30 is designed to be press-fitted into the center hole 42 of the cam 40 under the condition where each of the serrations 32, 34 is aligned with a predetermined position in the rotational direction in the casing 10 after the external tooth gear 21 of the locking tooth 20 has been engaged with the internal tooth gear 61 by the rotation of the cam 40. The serration 42a formed to the center hole 42 is designed to decrease the force required for press-fitting the press-fitting shaft portion 30a of the operating shaft 30 into the center hole 42 and, at the same time, to obtain stronger retention of the press-fitting shaft portion 30a upon completion of its press-fitting process.

The serration 32 of each of the operating shafts 30 disposed to the right and left sides of the seat is coupled with the serration 51 of the connecting shaft 50 with an engagement having play of predetermined degree in a rotational direction. This play is set to a minimum magnitude which allows, for example, the prevention of the disengagement of the right side external tooth gear 21 from the internal tooth gear 61, when a relatively large force is transferred from a belt anchor to the left side of seat cushion 150 and the left side operating shaft 30 is rotated by elastic deformation of the reinforcing members of the seat cushion 150, thus allowing this rotation to be subsequently transmitted via the connecting shaft 50 to the right side operating shaft 30.

Further, the locking teeth 20 are disposed at an angle of 180 degrees from each other about the rotational axis of the casing 10, while the locking cam faces 41 are formed around the center hole 42 of the cam 40 and separated away from each other by an angle of 180 degrees. The cam 40 has two outer peripheral faces 45 as guiding faces separated from each other by an angle of 180 degrees about the center hole 42 and lying on a straight line L2 perpendicular to a line L1 passing through two opposite locking cam faces 41. The casing 10 is provided with two first guiding projections 11A as guides which are disposed at an angle of 180 degrees from each other about the rotational axis of the casing 10 and lying on a straight line L4 perpendicular to a line L3 passing through two opposite locked cam faces 25 of the locking tooth 20. Each of the first guiding projections 11A is provided with a slide-contacting face 11c designed to slidably contact with the outer peripheral face 45. This outer peripheral face 45 is configured to have a circular arc face centered about the center hole 42 of the cam 40, enabling the circular arc face to be kept in slidable contact with the slide-contacting face 11c of the guiding projection 11A in the range of rotation of the cam 40. Note that the slide-contacting face 11c is provided with a surface which is parallel with the line L3 passing through two locked cam faces 25 of the locking teeth 20, thereby allowing the cam 40 to shift toward the locked cam face 25.

The following is a detailed explanation of each of the above-mentioned constitutions.

The casing 10 is fixed to a base plate 110 using welding or bolts or the like, the outer side of the base plate 110 constituting one of the reinforcing members of the seat cushion 150. The cap 60 is fixed to an arm plate 120 using welding or bolts or the like, the outer side of the arm plate 120 constituting one of the reinforcing members of the seat back 160. Further, a spiral spring 130 is wound coaxially with the casing 10 and the cap 60, the spiral spring 130 rotates the arm plate 120 toward the front F direction so as to incline the seat back 160 forward.

The casing 10 is disk-shaped as a whole and provided with a circular recessed portion 14 having a circular inner peripheral face 14a which is coaxially located close to the outer circumferential surface of the casing 10. Further, the casing 10 is provided, at its axial center, with a hole 17, allowing the operating shaft 30 to be inserted therein.

Further, two first guiding projections 11A, two second guiding projections 11B, two protrusions 13 and two pivots 16 project from the bottom of the circular recessed portion 14. The pivots 16 are designed to support the locking teeth 20 while allowing the pivoting of locking teeth 20. Each of the first guiding projections 11A is provided with a circular arc guiding face 11a for slidably guiding the first outer peripheral surface 27 of the locking tooth 20 which is allowed to pivot about the pivot 16. Each of the second guiding projections 11B is also provided with a circular arc guiding face 11b for slidably guiding the second outer peripheral surface 28 of the locking tooth 20 which is allowed to pivot about the pivot 16. The first outer peripheral surface 27, second outer peripheral surface 28, and the circular arc guiding faces 11a, 11b together form a circular arc around the center of rotation of the locking tooth 20, the movement of which is enabled by the pivot 16. Moreover, each of the first guiding projections 11A is provided, at the surface thereof facing the rotation center, with the above-mentioned slide-contacting face 11c.

One of the protrusions 13 is located between one set of a first guiding projection 11A and a second guiding projection 11B, while the other protrusion 13 is located between the other set of a first guiding projection 11A and a second guiding projection 11B. These protrusions 13 retain the base portion 70a of a locking spring 70.

Figure 1:
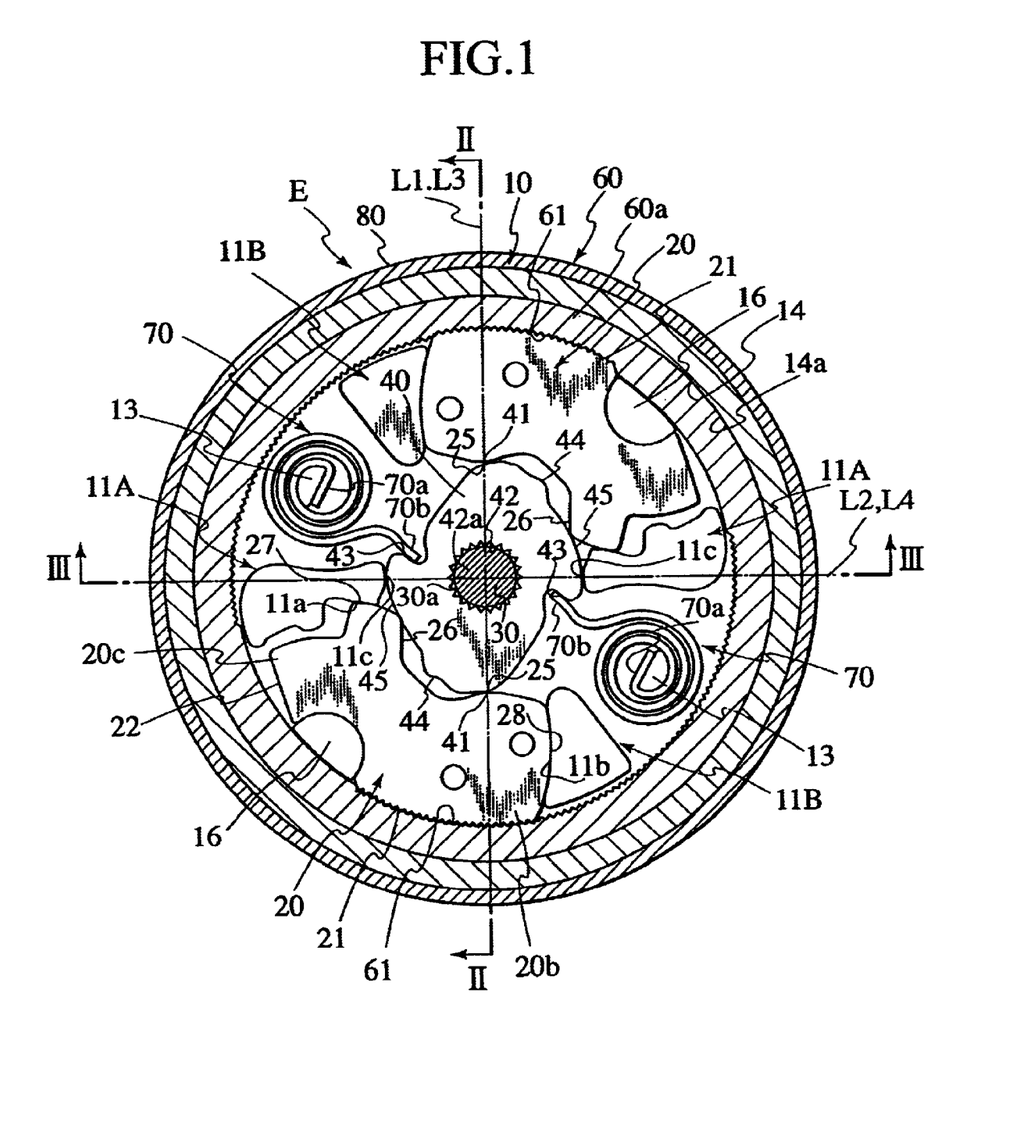
FIG. 1 is a front explanatory view of a main portion of a reclining device embodying the present invention.
Figure 2:
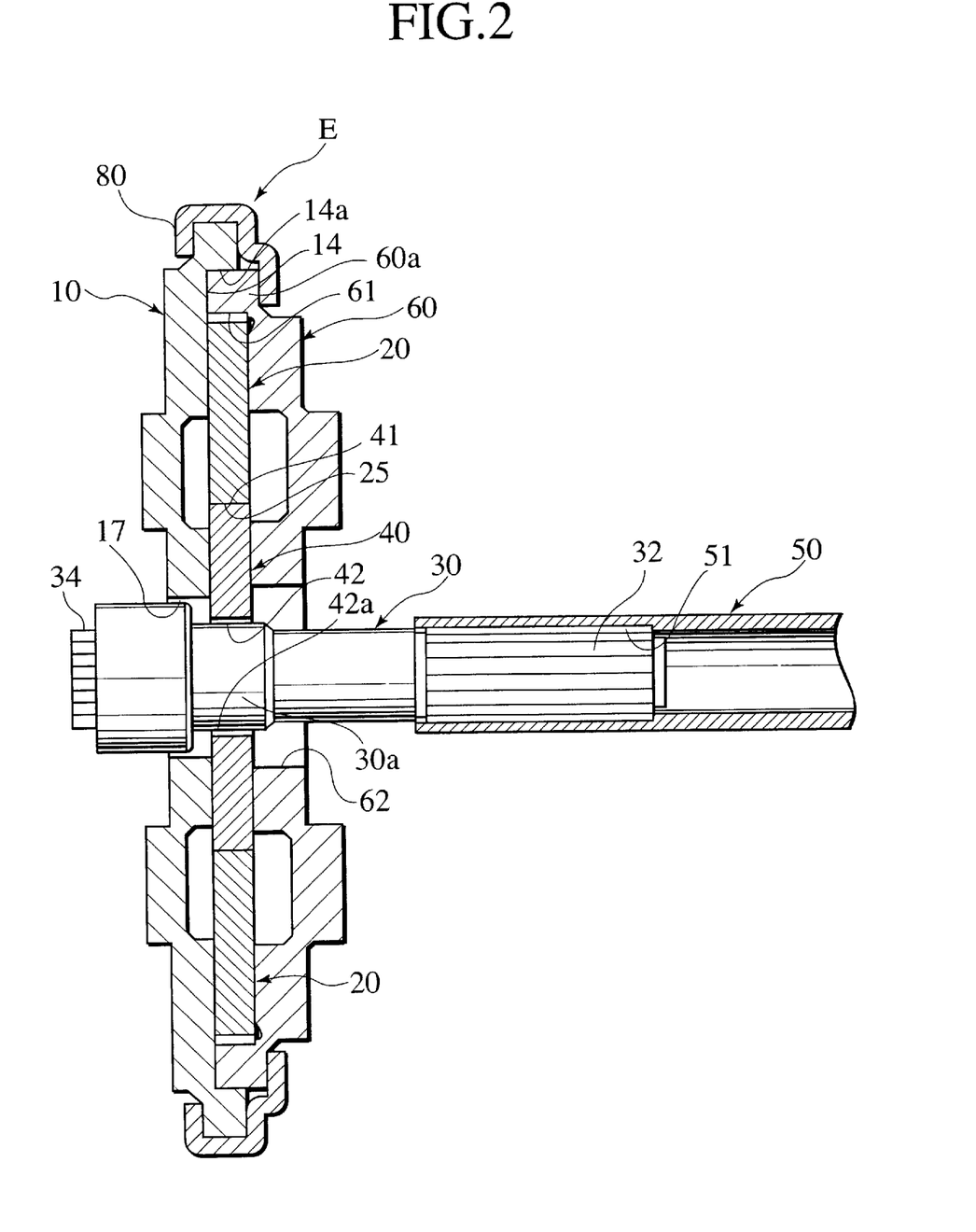
FIG. 2 is a cross-sectional view of the reclining device taken along the line II—II of FIG. 1.
Figure 3:
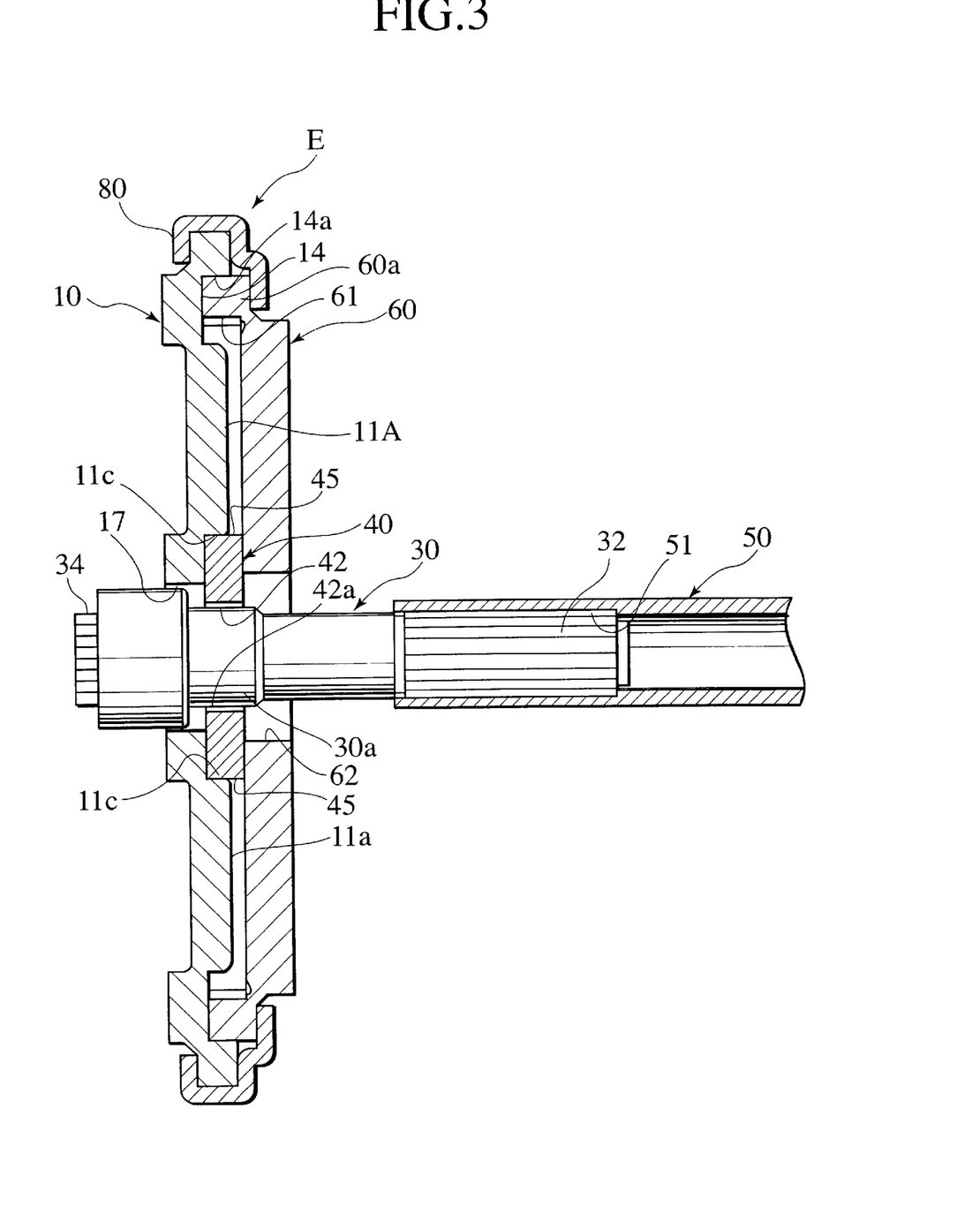
FIG. 3 is a cross-sectional view of the reclining device taken along the line III—III of FIG. 1.
Figure 4:
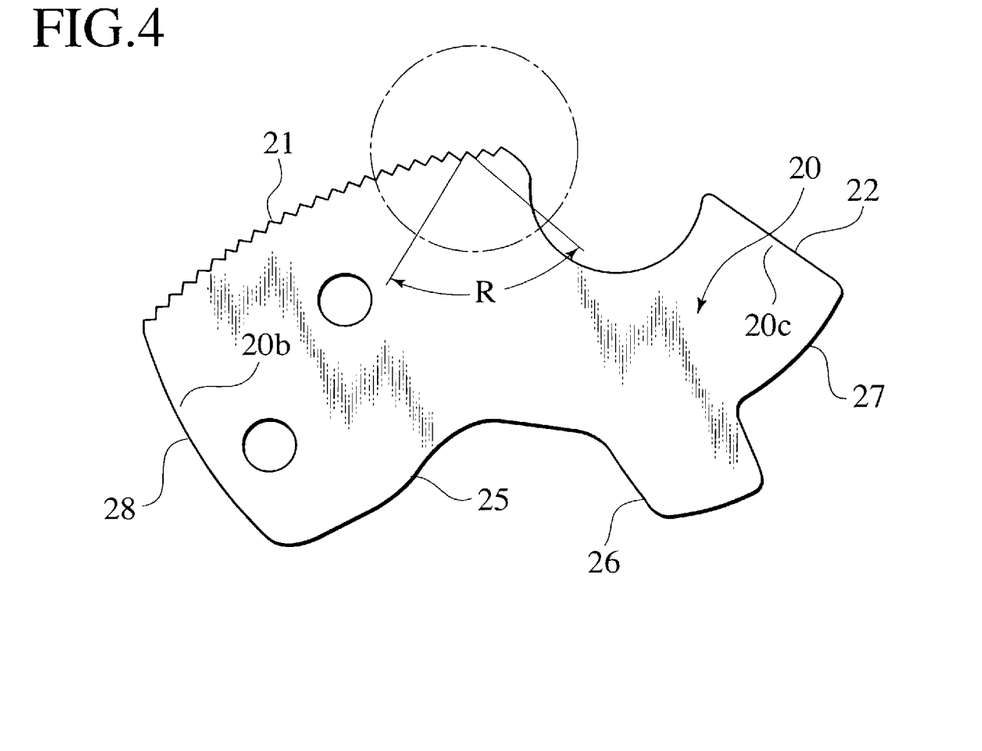
FIG. 4 is an enlarged front view illustrating the second gear of the seat reclining device.
Figure 5:
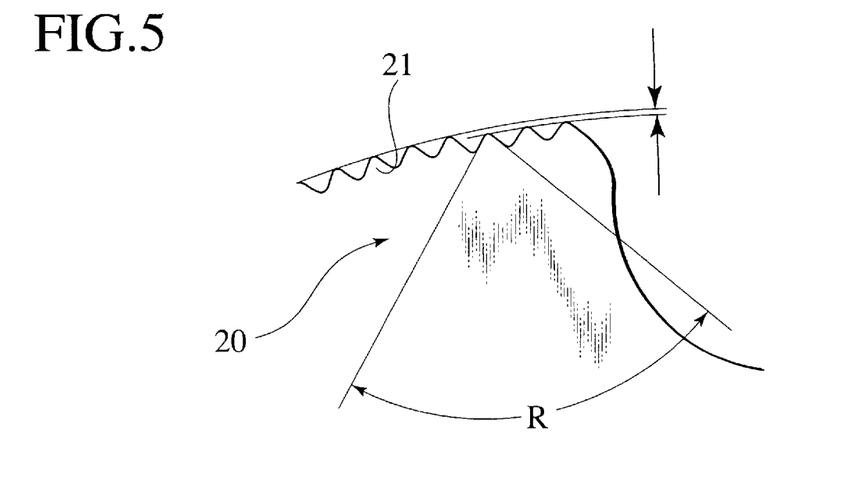
FIG. 5 is an enlarged view of a portion of the reclining device, which is encircled by a dashed line in FIG. 4.
Figure 6:
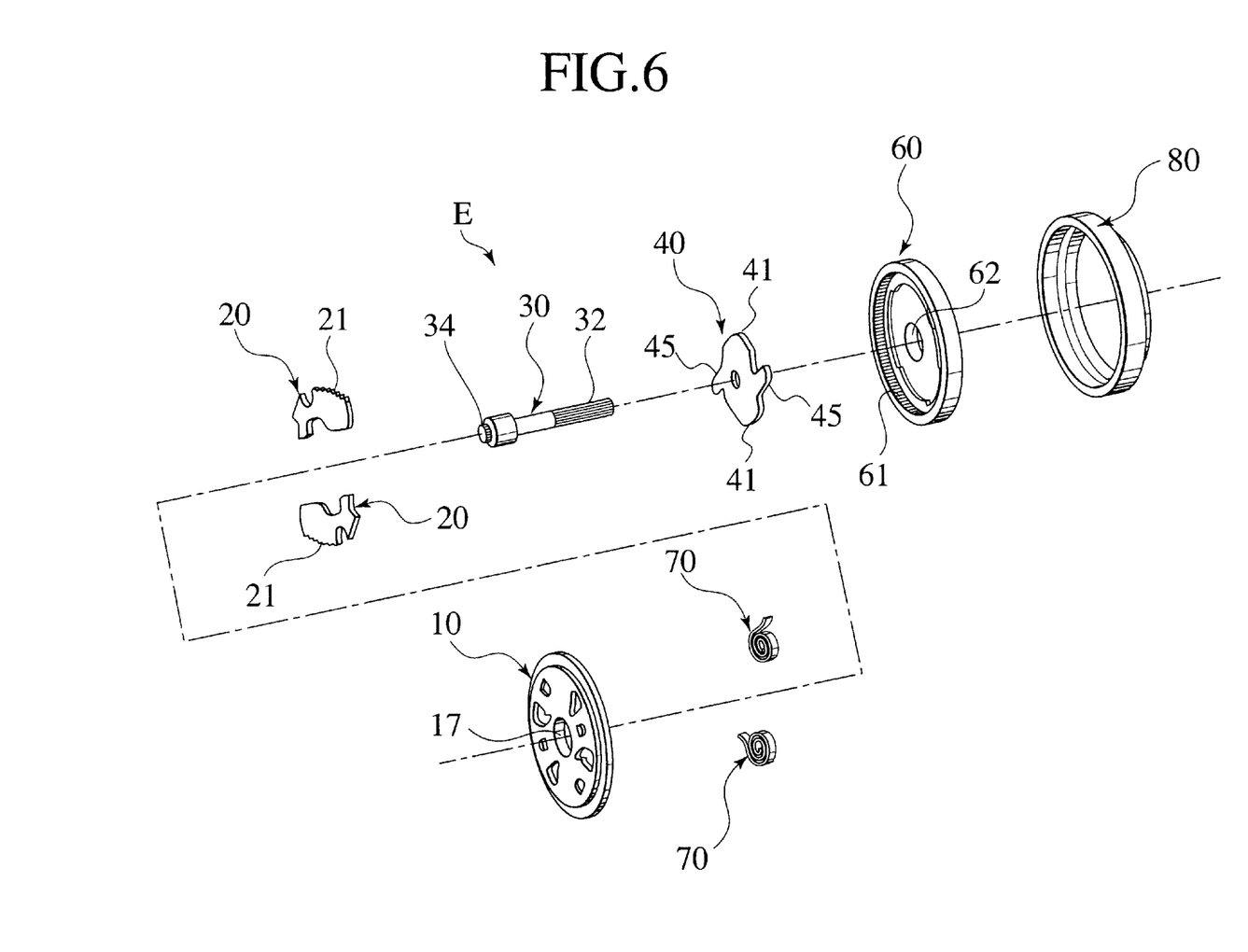
FIG. 6 is an exploded perspective view of a main portion of the reclining device.
Figure 7:
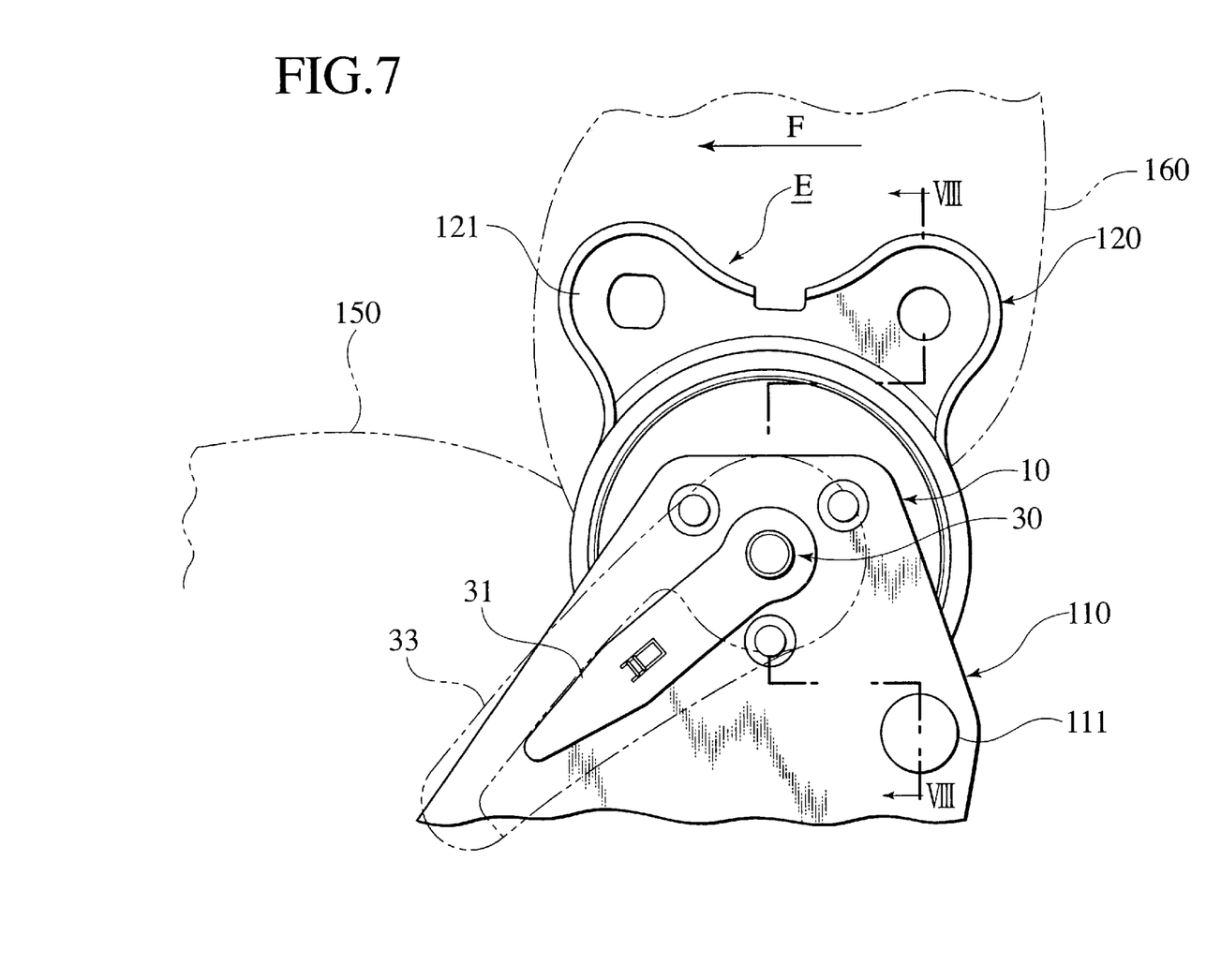
FIG. 7 is a front view of the reclining device.
Figure 8:
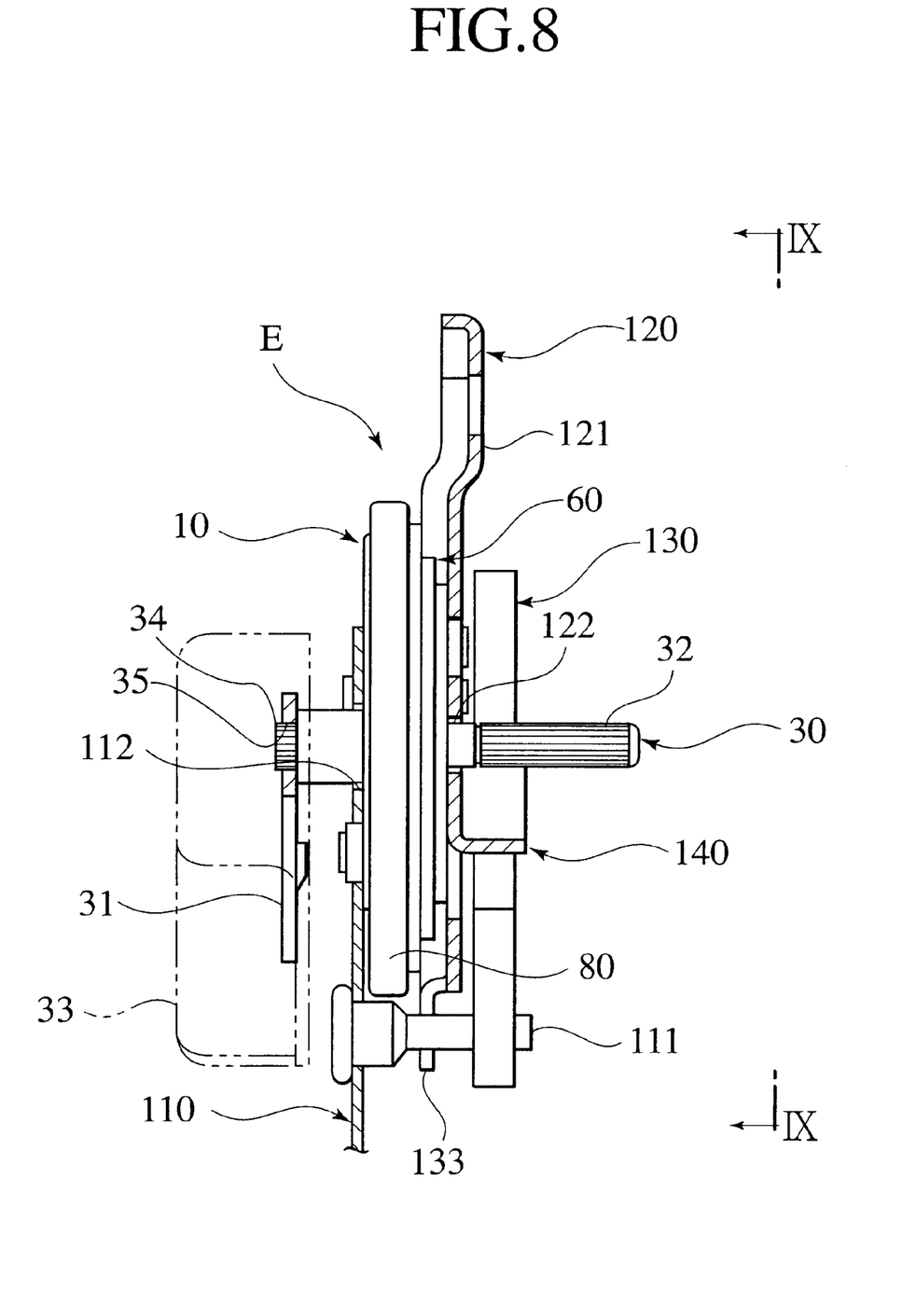
FIG. 8 is a cross-sectional view of the reclining device taken along the line VIII—VIII of FIG. 7.

The locking spring 70 is formed of a spiral spring and pushes the cam 40 to rotate in the counterclockwise direction of FIG. 1, thus pushing the external tooth gear 21 of the locking tooth 20 to keep it engaged with the internal tooth gear 61.

All of the first guiding projections 11A, the second guiding projections 1B, the protrusions 13 and the pivots 16 are formed integrally with the casing 10 by means of an embossing finish using a press.

The cap 60 is disk-shaped like the casing 10, and provided with the internal tooth gear 61 which is formed along the inner circumferential surface of a rim 60a adapted to be rotatably engaged with the inner circumferential surface 14a of the casing 10. Further, this cap 60 is provided, at the axial center thereof, with a hole 62, allowing the operating shaft 30 to be inserted therein.

The external peripheries of the cap 60 and casing 10 are covered and held together by a ring-shaped holder 80, thereby rotatably retaining them without allowing separation in an axial direction.

Each of the locking teeth 20 is provided with the above-mentioned external tooth gear 21 at a position on one side of the pivot 16 and facing the internal tooth gear 61. The external tooth gear 21 is provided, on its rear side, with the locked cam face 25 as a first locking cam face which is designed to receive force from the locking cam face 41 as a second locking cam face of the cam 40. In other words, when the locking tooth 20 receives force from the locking cam face 41 of the cam 40 on the locked cam face 25, the locking tooth 20 is enabled to rotate in the clockwise direction centered on the pivot 16, thereby allowing the external tooth gear 21 to engage with the internal tooth gear 61.

The external tooth gear 21 is formed to a region close to the pivot 16. The pressure angle R of the teeth of the external tooth gear 21 and the internal tooth gear 61 is in the range of 60 to 90 degrees. The height of the teeth on the pivot 16 side of the external tooth gear 21 is lower than that of the other teeth. The radius of a tooth tip in this portion is larger than that of the other tooth tip.

The external peripheral surface 22, with the pivot 16 interposed between it and the external tooth gear 21, is cut flat so as to prevent the external peripheral surface 22 from interfering with the internal tooth gear 61. On the rear side of this external peripheral surface 22, a lock-released cam face 26 designed to receive force from the lock-releasing cam face 44 of the cam 40 is disposed. In other words, when the lock-released cam face 26 of the locking tooth 20 receives force from the lock-releasing cam face 44 of the cam 40, the locking tooth 20 rotates in the counterclockwise direction, thereby allowing the external tooth gear 21 to disengage from the internal tooth gear 61.

The operating shaft 30 is loosely fitted in the hole 17 of the casing 10, in the hole 62 of the cap 60, and also in the supporting holes 112 and 122 formed in the base plate 110 and the arm plate 120, respectively. The serrations 34 of the operating shaft 30 project out into the base plate 110, while the serrations 32 project out into the arm plate 120. Note that the operating lever 31 attached to the serration 34 is provided with an operating knob 33 and serration 35 for the attachment.

The cam 40 is designed to be fixed to the press-fitting shaft portion 30a of the operating shaft 30 via the center hole 42 provided to the cam 40 by press-fitting. The cam 40 is provided, on the external peripheral surface thereof, with two locking cam faces 41 and with two lock-releasing cam faces 44. Furthermore, the cam 40 is also provided with an engaging portion 43 which is designed to engage with the outer edge 70b of the locking spring 70.

The locking spring 70 is formed of a spiral spring. The base portion 70a thereof is retained by a projection 13, while the outer edge 70b thereof is designed to be engaged with the engaging portion 43 of the cam 40, thereby providing a rotating force to rotate the cam 40 in the counterclockwise direction of FIG. 1. The cam 40 is designed to receive the rotating force in a tangential direction from two locking springs 70 through the engaging portions 43 disposed at two locations in axial symmetry with a rotational axis.

The arm plate 120 is provided with an attachment portion 121 to the seat back 160, and with a retaining means 140 for retaining the inner portion 131 of the spiral spring 130.

This retaining means 140 is located on the lower side of the hole 122 of the arm plate 120 and is formed by cutting and bending a portion of the arm plate 120 in a semi-circular configuration along the locus of a predetermined radius of curvature centered on the hole 122. The inner end 132 of the spiral spring 130 hooks onto a recessed portion (not shown) formed at a fringe portion of the cut-bent portion 141.

The outer end 133 of the spiral spring 130 is hooked onto a hook pin 111 attached to the base plate 110. The arm plate 120 biased so as to rotate in a direction forward the front F by this spiral spring 130.

Figure 9:
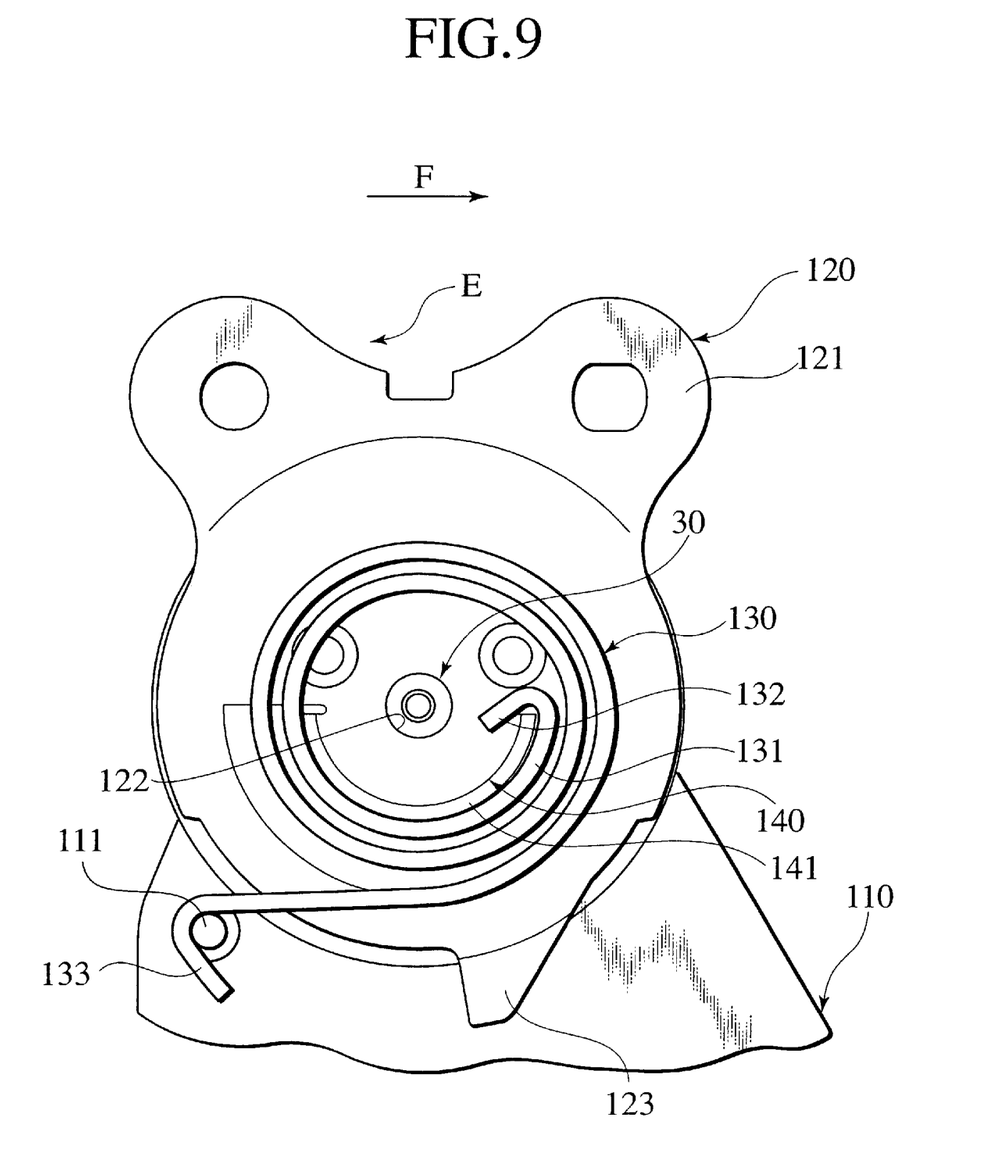
FIG. 9 is a side view of the reclining device as seen from the direction of the arrows represented by the line IX—IX of FIG. 8.

Note that, in FIG. 9, the reference number 123 represents a stopper for preventing the forward inclination of the seat back. When the arm plate 120, that is, the seat back 160 is rotated in the direction of the front F, the stopper 123 abuts the hook pin 111 of the base plate 110, so as to regulate the rotation of the seat back 160 in the direction of the front F.

Next, the functions and effects and the like of this seat reclining device E for vehicle will be explained.

When assembling the seat reclining device E, the cam 40 and the locking spring 70 are attached to the casing 10 at first. In this condition, due to the rotational force of the locking spring 70, the external end 70b of the locking spring 70 is kept engaged with the slide-contacting face 11c of the guiding projection 11A, and the engaging portion 43 of the cam 40 is not engaged with the external end 70b.

Next, by using a shaft-shaped sustaining member (not shown) provided with a serration which is adapted to engage with the serration 42a formed at the center hole 42 of the cam 40, the cam 40 is rotated in the clockwise direction of FIG. 1. As a result, the external end 70b of the locking spring 70 engages with the engaging portion 43 of the cam 40. Under this condition, the locking tooth 20 is attached to the casing 10, and then, the cap 60 is fitted in the circular recessed portion 14 of the casing 10. In other words, the serration of the sustaining member is inserted into the center hole 42, and then, rotated in the clockwise direction of FIG. 1. As a result, the locking tooth 20 is rotated in a counter-clockwise direction by the lock-releasing cam face 44 and the lock-released cam face 26, thereby enabling the external tooth gear 21 to move toward the inner side in a radial direction from the imaginary position of the internal tooth gear 61 of the cap 60. Then, the rim portion 60a is inserted between the inner peripheral surface 14a of the casing 10 and the external tooth gear 21 of the locking tooth 20, thereby enabling the cap 60 to be fitted in the circular recessed portion 14 of the casing 10. Subsequently, the retaining member is released, thereby allowing the locking tooth 20 to rotate in the clockwise direction via the cam 40 by the rotating force of the locking spring 70, thus enabling the external tooth gear 21 to engage with the internal tooth gear 61. In other words, the locking tooth 20 is allowed to rotate in the clockwise direction until engagement between the external tooth gear 21 and the internal tooth gear 61 is accomplished. The retaining member can be dismounted after the assembling of the cap 60.

Then, the external peripheries of these cap 60 and casing 10 are covered by the holder 80, which rotatably supports them together without allowing them to separate in an axial direction.

After the assembly of the casing 10, the locking teeth 20, the cam 40, the cap 60, the locking springs 70 and the holder 80 has been completed as described above, the press-fitting shaft portion 30a of the operating shaft 30 is press-fitted into the center hole 42 of the cam 40 under the condition where each of the serrations 32, 34 is aligned with a predetermined position in the casing 10.

After the assembly is finished, the seat reclining device E is attached to the right and left sides of the seat. At this time, the serration 32 of each of the operating shafts 30 is engaged with the serration 51 of the connecting shaft 50.

Further, the serration 34 of the operating shaft 30 which is located on one side, door side of the driver's seat is engaged with the serration 35 of the operating lever 31. Additionally, the operating lever 31 is fixed to the operating shaft 30 by means of a bolt or the like (not shown). Likewise, the operating shaft 30 which is located on the other side, door side of the passenger seat is engaged with the operating lever 31.

After the attachment of the reclining device to the seat is finished, the cam 40 is kept rotated in a counterclockwise direction of FIG. 1 due to the spring force of the locking spring 70. As a result, the locked cam faces 25 of the locking teeth 20 are pushed by the locking cam faces 41, and hence the locking teeth 20 are rotated in the clockwise direction about the pivot 16, thereby enabling the external tooth gears 21 to engage with the internal tooth gear 61 of the cap 60.

In other words, the rotation of the seat back 160 is prevented. In this condition, the lines L1 and L2, and L3 and L4 are approximately superimposed as shown in FIG. 1, respectively.

On the other hand, when the operating knob 33 of the operating lever 31 is manipulated to rotate the operating shaft 30 in the clockwise direction of FIG. 1, the engagement between the locking cam faces 41 of the cam 40 and the locked cam faces 25 of the locking teeth 20 is released, and thereby the lock-releasing cam faces 44 press the lock-released cam faces 26 of the locking teeth 20.

Further, when the lock tooth portions are pivoted in the counterclockwise direction of FIG. 1 about the pivots 16 respectively, the engagement between the external tooth gears 21 and the internal tooth gear 61 of the cap 60 is released to form a lock-released state, thereby permitting the arm plate 120 attached to the cap 60, that is, the seat back 160 to rotate in the direction of the front F by means of the spiral spring 130.

If it is desired to reset to the locked state from this lock-released state, first the seat back 160 is reclined to the desired inclined position, and then the maneuvering grip on the operating knob 33 is released. As a result, due to the force of the locking springs 70, the cam 40 is allowed to rotate in the counterclockwise direction of FIG. 1, by which the locking teeth 20 rotates in the clockwise direction of FIG. 1, thereby enabling the external tooth gears 21 to engage with the internal tooth gear 61, thus forming a locked state.

According to the above-mentioned seat reclining device E, since the press-fitting shaft portion 30a of the operating shaft 30 is press-fitted into the center hole 42 of the cam 40 under the condition where each of the serrations 32, 34 is aligned with a predetermined position in the casing 10, the angle of rotation of the operating shaft 30 with respect to the casing 10 can be kept constant. In other words, since the operating shaft 30 is press-fitted into the center hole 42 with the cam 40 locked, the rotational position of the operating shaft 30, that is, the angle of the operating shaft 30 can be kept constant under the locked condition. Further, since the casing 10 is secured to the seat cushion 150, the direction in which the operating lever 31 extends can be kept constant with respect to the seat cushion 150, thus improving the external appearance of the device.

Further, since the casings 10 are disposed on both the right and left sides of seat cushion 150, and coupled with the caps 60 which are disposed on both the right and left sides of the seat back 160, the seat back 160 can be reliably and safely retained at a predetermined angle.

Further, as for the operating shafts 30 on both sides, since the position in the rotational direction of the serration 32 can be kept constant relative to the casing 10, the connecting shaft 50 can be easily linked via each of the serrations 32 to each of the operating shafts 30. In other words, since the rotational position, that is, the angle of the serrations 32 of each of the operating shafts 30 on both sides can be kept consistent, the serration 32 can be easily engaged with the serration 51 with minimal play in the direction of rotation at the fitting portion of the serration 32 of each of the operating shafts 30 with the serration 51 of the connecting shaft 50.

As a result, it becomes possible to minimize the time difference of engagement or disengagement between the tooth portions 21 and the internal tooth gear 61 on both sides of the seat when the operating lever 31 is manipulated.

With respect to the play, it is preferable that the play is confined to a minimum as long as disengagement between the tooth portions 21 and the internal tooth gear 61 is prevented even when a relatively large force is transferred from a belt anchor attached to one side of the seat cushion 150 to the reinforcing member of the seat cushion 150, causing the operating shaft 30 to rotate due to the elastic deformation of the reinforcing member or the like, and this rotation is then transmitted via the connecting shaft 50 to the operating shaft 30 of the other side. However, it is no longer required to provide the degree of play required by the conventional assembling procedures.

Therefore, the feeling when changing and setting the angle of seat back 160 can be improved.

Further, since the locking teeth 20 are rotatably supported by the pivots 16 protruded from the casing 10 as well as by two circular arc guiding faces 11a and 11b, even if a strong impact on the seat back 160 is transmitted to the locking teeth 20, the locking teeth 20 are supported by the pivots 16 and by one of the circular arc guiding faces. Since the load-receiving surface can be thus increased, the mechanical strength of the reclining device is greatly improved.

Further, since two outer peripheral faces 45 which are separated from each other by an angle of 180 degrees around the center hole 42 and lying on a straight line perpendicular to a line passing through two opposite locking cam faces 41 of the cam plate are designed to be slidably contacted with the slide-contacting face 11c of the guiding projections 11A which are distanced from each other by an angle of 180 degrees about rotational axis of the casing 10 and lying on a straight line perpendicular to a line passing through two opposite locked cam faces 25 of the locking tooth 20, the freedom of rotation of the cam 40 as well as the freedom of movement of the cam 40 in the direction where the locked cam faces 25 are disposed cannot be obstructed, and at the same time, the movement of the cam 40 in the direction perpendicular to the direction where the locked cam faces 25 are disposed can be prevented, thus stabilizing the cam 40.

Moreover, since the cam 40 can be moved to a position where the pushing force thereof against each of the locking teeth 20 is balanced, the external tooth gear 21 of each of the locking teeth 20 can be reliably engaged with the internal tooth gear 61. Additionally, since it is no longer required to provide play at the fitting portion of the center hole of the cam 40 with the operating shaft for the purpose of the balance of the pushing force as in the case of the prior art, the generation of abnormal noise due to play can be prevented, and at the same time, any increase in the number of parts as well as in the number of steps for preventing the generation of abnormal noise can be prevented.

Additionally, since the position of the cam 40 can be kept stabile due to the provision of the guiding projection 11A, the press-fitting of the operating shaft 30 into a center hole 42 of the cam 40 can be facilitated even if it is executed after the completion of the assembly of the casing 10, the cap 60, the locking teeth 20, the cam 40 and the like.

Further, since each of the outer peripheral faces 45 is formed as a circular arc centered about the center hole 42, and is designed to be slidably contacted with the slide-contacting face 11c of the guiding projections 11A whilst being within the rotational range of the cam 40, the degree of freedom of rotation of the cam 40 as well as the freedom of movement of the cam 40 in the direction where the locking teeth 20 are disposed can be more reliably maintained.

The invention may be practiced or embodied in other ways without departing from its sprit or essential character. For instance, the seat reclining device E can be disposed at only one side of seat, and the casing 10 may be attached to the arm plate 120, and the cap 60 may be attached to the seat cushion 150.

The preferred embodiments described herein are therefore illustrative and not restrictive, the scope of the invention being indicated by the claims, and all variations which come within the meaning of claims are intended to be embraced herein.

What is claimed is:

1. A reclining device comprising:
    a casing having on its inner surface a pair of first guide projections;
    a cap rotatably mounted on the casing, having a first gear along an inner circumference thereof;
    a pair of second gears for engaging with the first gear, disposed in axial symmetry with a rotational axis of the casing, each second gear having a first locking cam face; and
    a cam comprising:
        a pair of second locking cam faces for pressing the first locking cam faces respectively to thereby engage the second gears with the first gear; and
        a pair of guiding faces operative to slide on the respective first guide projections, disposed in axial symmetry with a rotational axis of the cam,
        wherein the cam is guided by the first guide projections so as to be rotatable about the rotational axis of the cam with the guiding faces thereof slid on the respective guide projections and movable in a crossing direction to a first straight line which passes through contact points between the guiding faces of the cam and the guide projections.

2. The reclining device according to claim 1, wherein each of the guiding faces forms a circular arc centered about the rotational axis of the cam, thereby enabling the guiding faces to be kept in contact with the guides in the range of rotation of the cam.

3. The reclining device according to claim 1, wherein the casing has on its inner surface a pair of second guide projections for guiding the second gears, each second guide projection having a circular arc guiding face for slidably guiding the respective second gears.

4. The reclining device according to claim 1,
    wherein each second gears has a first lock-releasing cam face, and
    the cam further comprises a pair of second lock-releasing cam faces for pressing the first lock-releasing cam faces of the second gears to thereby disengage the second gears from the first gear.

5. The reclining device according to claim 1, further comprising a shaft having a coupling portion for transmitting external torque, wherein the shaft is configured to be press-fitted into a center hole of the cam when the coupling portion is aligned with the casing at a predetermined rotational angle.

6. The reclining device according to claim 5, wherein the shaft is configured to be press-fitted into the center hole of the cam after the engagement of the second gears with the first gears at a predetermined rotational angle.

7. The reclining device according to claim 5, wherein the center hole of the cam is provided with a serration and the shaft has a fitting portion to be press-fitted into the center hole.

8. The reclining device according to claim 5, further comprising a connecting shaft,
    wherein one of the casing and the cap is disposed on both the right and left sides of a seat cushion, the other of the casing and the cap is disposed on both the right and left sides of a seat back, and the connecting shaft connects the shafts at both the right and left sides via each of the coupling portions.

9. The reclining device according to claim 8,
    wherein the coupling portions which are connected to the connecting shaft interposed therebetween have play of a predetermined angle in a rotational direction.

10. The reclining device according to claim 1, wherein contact points between the first and second locking cam faces are set on a second straight line perpendicular to the first straight line, as the second gears are engaged with the first gear.

11. The reclining device according to claim 10, wherein the first and second straight lines intersect on the rotational axis of the cam.

12. The reclining device according to claim 11, wherein each of the first guide projection has a sliding face parallel to the second straight line, on which the guiding face of the cam is slid.

13. The reclining device according to claim 1, further comprising a pair of springs for providing a rotating force to rotate the cam, fixed to the inner surface of the casing,
    wherein an end of the spring is configured to be engageable with the first guide projection.

14. The reclining device according to claim 13, wherein the cam has a pair of engaging portions for engaging the ends of the springs, and the ends of the springs are received by the engaging portions as the cam is rotated.

15. A method of manufacturing a reclining device, comprising the steps of:
    preparing a casing having on its inner surface a pair of first guide projections;
    preparing a cap, which is rotatably mounted to the casing, having a first gear along an inner circumference thereof;
    preparing a pair of second gears, which are for engaging with the first gear, disposed in axial symmetry with a rotational axis of the casing, each second gear having a first locking cam face;
    preparing a cam, which comprises a pair of second locking cam faces for pressing the first locking cam faces respectively to thereby engage the second gears with the first gear, and a pair of guiding faces operative to slide on the respective first guide projections, disposed in axial symmetry with a rotational axis of the cam, and has a center hole, wherein the cam is guided by the first guide projections so as to be rotatable about the rotational axis of the cam with the guiding faces thereof slid on the respective guide projections and movable in a crossing direction to a first straight line which passes through contact points between the guiding faces of the cam and the guide projections;
    preparing a shaft for transmitting external torque to the cam, having a coupling portion;
    assembling all of the casing, the second gears, the cam and the cap;
    aligning the coupling portion of the shaft with the casing at a predetermined rotational angle; and
    press-fitting the shaft into the center hole of the cam.

16. The method of manufacturing the reclining device according to claim 15, wherein the step of aligning the coupling portion with the casing at a predetermined rotational angle is performed with the second gears engaged with the first gear at the predetermined rotational angle.

* * * * *